United States Patent [19]

Fox

Best Available Copy

[11] E Re. 30,257

[45] Reissued Apr. 22, 1980

[54] WELL DRILLING TOOL

[75] Inventor: Fred K. Fox, Houston, Tex.

[73] Assignee: Engineering Enterprises, Inc., Houston, Tex.

[21] Appl. No.: 939,908

[22] Filed: Sep. 5, 1978

Related U.S. Patent Documents

Reissue of:

[64] Patent No.: 4,019,591
Issued: Apr. 26, 1977
Appl. No.: 645,930
Filed: Dec. 31, 1975

U.S. Applications:

[63] Continuation-in-part of Ser. No. 584,964, Jun. 9, 1975, abandoned, and Ser. No. 546,006, Jan. 31, 1975, Pat. No. 3,971,450.

[51] Int. Cl.[2] ..... E21B 3/12; E21B 41/00

[52] U.S. Cl. ..... 175/107; 175/228; 277/135; 308/DIG. 9; 415/502

[58] Field of Search ..... 175/107, 228; 415/502; 308/DIG. 9; 277/72 FM, 135

[56] References Cited

U.S. PATENT DOCUMENTS

| | | | |
|---|---|---|---|
| 2,456,496 | 12/1948 | Ford et al. | 308/DIG. 9 |
| 2,646,962 | 7/1953 | Wagner | 415/502 |
| 3,232,362 | 2/1966 | Cullen et al. | 175/107 |
| 3,291,230 | 12/1966 | Cullen et al. | 175/107 |
| 3,659,662 | 5/1972 | Dickey | 175/107 |
| 3,741,321 | 6/1973 | Slover, Jr. et al. | 175/107 |
| 3,749,511 | 7/1973 | Mayall | 415/502 |
| 3,807,513 | 4/1974 | Kern et al. | 175/107 |

FOREIGN PATENT DOCUMENTS

| | | | |
|---|---|---|---|
| 201583 | 2/1922 | United Kingdom | 175/228 |
| 132473 | 10/1960 | U.S.S.R. | |

*Primary Examiner*—James A. Leppink
*Assistant Examiner*—Richard E. Favreau
*Attorney, Agent, or Firm*—Marvin E. Eickenroht; Jennings B. Thompson

[57] ABSTRACT

There are disclosed several embodiments of a well tool which is adapted to be connected as part of a pipe string through which drilling fluid is circulated, and which comprises inner and outer members which are rotated with respect to one another by a motor between them.

50 Claims, 3 Drawing Figures

WELL DRILLING TOOL

Matter enclosed in heavy brackets [ ] appears in the original patent but forms no part of this reissue specification; matter printed in italics indicates the additions made by reissue.

This application is a continuation-in-part of my copending applications, Ser. No. 584,964, filed June 9, 1975, and entitled "Well Drilling Tool," *now abandoned* and Ser. No. 546,006, filed Jan. 31, 1975, and entitled "Well Drilling Tool" and now U.S. Pat. No. 3,971,450.

This invention relates to improvements in a well tool of the type which is adapted to be connected as part of a pipe string through which drilling fluid is circulated, and which comprises inner and outer members which are supported for relative rotation and sealed with respect to one another by means of bearings and seals, respectively, within an annular space between them in which a motor for causing their relative rotation is contained.

In one such type of tool which is used in the drilling of a well, the inner member comprises a shaft connected to a drill bit, and the outer member comprises a tubular member connected to the lower end of a drill string, whereby the bit may be rotated by means of the motor without rotation of the drill string. In a so-called turbodrill, the motor is of a fluid type, comprising turbine blades on the inner and outer members which are driven by the circulation of drilling fluid through the annular space between them. Upon passage through the turbine section, the drilling fluid is confined for passage out through the bit on the lower end of the shaft.

In another drilling tool of this general type, such as that disclosed in U.S. Pat. No. 3,656,565, the shaft member is connected at its opposite ends to the drill string and bit, and the tubular member is caused to rotate with respect to the shaft member by means of the motor therebetween, whereby spiral blades carried about the tubular member are useful in reducing bottom hole pressure in the well bore. As in the case of a turbodrill, the motor may comprise turbine blades on the shaft and tubular members within the annular space between them, and the drilling fluid which is circulated through the motor is confined for passage out through the bit.

Due to the drop in pressure across the turbine section and the bit, there is a substantial pressure differential across the seal means of drilling tools of this type; and, as well known, a rotary seal means which divides pressure in this manner is subject to considerably greater wear than one which merely divides fluids at the same pressure. This problem of wear is even more serious due to abrasive particles in the drilling fluid which find their way between the surfaces of the seal means and the tubular members which they engage.

Unless protected therefrom, the bearings mounted in the annular space are also damaged by the abrasive particles in the drilling fluid. Since their replacement requires raising and lowering the drill string at great expense, efforts have been made to exclude drilling fluid from the bearings by containing them in a lubricant chamber formed at least in part by a pair of seal means in the annular space. However, if one or both of these seal means also functions as a pressure divider, it becomes worn and eventually permits the well fluid abrasives to enter the lubricant chamber.

U.S. Pat. No. 3,659,662, discloses a tool which is intended to overcome this problem by providing a tool in which a labyrinth is provided within the annular space, and the tubular member is ported in such a manner that the pressure drop is taken across the labyrinth, and pressure is equalized across the seal means forming the lubricant chamber in which the bearings are contained. However, if the passages through the labyrinth are small, they tend to be clogged by the particles in the drilling fluid, thereby lessening the cooling effect; and, if they are so large as to pass a large volume of drilling fluid, the drilling efficiency of the bit is lowered considerably. Furthermore, even if the labyrinth is to be replaced by a third seal means of the non-leaking type, as disclosed in my aforementioned copending application, Ser. No. 546,006, it might still be subject to damage by the tendency of particles in the drilling fluid to enter between the sealing faces.

The primary object of this invention is to provide a tool of this type in which the pressure dividing seal means is protected from the damaging effect of the drilling fluid particles.

Another object is to provide such a tool in which the bearing means is also protected in such a manner that it need not be contained in a separate lubricant chamber, thereby eliminating the necessity of additional seal means for defining the chamber.

These and other objects are accomplished in accordance with the illustrated embodiments of this invention, by a tool of the type described including seal means between the members for separating fluid on the outer side of the tool from that within the annular space above the seal means, and a body of material within the space above the seal means which includes a metallic weighting substance which is liquid during drilling operations, and which has a specific gravity which is sufficiently greater than that of the drilling fluid and which is sufficiently insoluble with the drilling fluid, during drilling operations, that it substantially excludes drilling fluid therefrom. Consequently, the seal means is protected despite the presence of abrasives in the drilling fluid which would otherwise damage the seal means, and thereby permit it to leak. Ordinarily, the material is a lubricant which, in addition to excluding mud from the seal means, facilitates operation of the tool by reducing the frictional resistance to relative rotation between the shaft member and tubular member.

In the preferred embodiment of the invention, the bearing means which supports the members for relative rotation is contained within the annular space above the seal means but beneath the upper level of the lubricant. In this manner, the lubricant not only facilitates operation of the bearing means, but also protects it as well as the pressure dividing seal means, so that it is unnecessary to provide additional seal means within the annular space to define a separate lubricant chamber for the bearing means.

In alternative embodiments of the invention, the bearing means is instead contained within a variable volume lubricant chamber which is defined at least in part between an additional pair of seal means; and, as in the above-described tool, the additional seal means separate the lubricant therein from fluid at substantially the same pressure—in one form that on the inside of the tool, and, in another form, that on the outside of the tool. Consequently, there is substantially no pressure differential across the additional seal means so that the lubricant may be a conventional type having a specific gravity substantially less than that of the drilling fluid. Although requiring additional means, and thus usually less preferred than the first embodiment of the tool, these latter embodiments may be preferred in the event the drilling fluid requires the use of a seal protecting lubricant which is so heavy as to interfere with operation of the bearing means.

Drilling fluids are usually water base "muds" consisting of water, clay and barite, and having sufficiently high density to contain high formation pressures which might be encountered in drilling a well. During circulation within the well, the drilling mud also picks up "drill solids" such as sand and shale, which add to the abrasiveness of the barite particles. Such muds have densities greater than conventional lubricants, and some have specific gravities of about 2.4 to 2.5.

Since mud having the above-noted density is presently the heaviest normally used during drilling operations, and further since formation pressures requiring such a heavy mud are not always encountered, this invention contemplates that a seal protecting lubricant having a specific gravity of not substantially less than 2.5 may be heavy enough. On the other hand, large differentials between the specific gravities of the mud and lubricant make it more difficult for the two materials to be mixed with another, so that a lubricant having a higher specific gravity may be desired. In fact, in the event the tool is to be left in the well bore over an extended period of time, during which abrasive particles in the mud might otherwise settle out above the upper level of the lubricant, a specific gravity such as 4.5 or at least higher than that of the barite (4.2) is preferred.

There are instances, however, in which a well is drilled with a lighter drilling fluid, such as when the formation pressure is quite low, and care must be taken to prevent losing circulation of the drilling fluid. However, such drilling fluids are of an oil-base type which is inherently soluble with conventional lubricants. Hence, the invention contemplates that while the seal protecting lubricant for such use need not be much heavier than conventional lubricants, it must be sufficiently insoluble with the drilling fluid to substantially exclude drilling mud from the seal means, and the bearing means, where appropriate, during drilling operations.

Since agitation is known to promote the mixture of two otherwise relatively insoluble materials, the tool of this invention also includes a ring which fits relatively closely within the annular space and floats on the interface between the drilling mud and the seal protecting lubricant. In addition to minimizing agitation, the ring tends to keep the lubricant from running out of the annular space in which it is contained, as when the tool is laid down on its side during non-use.

The specific gravity of conventional grease type lubricants may be increased by the addition of solid metal particles thereto. Silicone base greases are preferred due to their stability insofar as temperature is concerned as well as their greater resistance to mixing with drilling mud. Alternatively, lead, copper, zinc, silver and the like, or alloys thereof with other materials, which are known to be good lubricants, may be used as the seal protecting lubricant. Although in solid form at ambient surface level temperatures, such materials may be liquid under conditions encountered in the bearing means during drilling operations. In fact, downhole temperatures are often so high that they reduce the viscosity of the lubricants.

The use of a metal or a metal impregnated liquid as a seal protecting lubricant has the added advantage of acting as a heat conductor, and as such, it serves to dissipate much of the heat generated in the bearing means during drilling operations.

The selection of lubricant materials which are sufficiently insoluble with the drilling fluid is well within the realm of one having ordinary skill in the art, having in mind that in a broad sense, the term "soluble" is used not only to include chemical solutions, but also dispersions and other mixtures of the drilling fluid and lubricant which would permit substantial amounts of the drilling fluid to penetrate the lubricant. In this respect, it will also be appreciated that small intrusions of solid particles from the drilling fluid may not damage the seal means or the bearing means, where appropriate, to such an extent as to interfere with the intended use of the tool during a reasonable time frame. In this regard, it is contemplated that the bearing means should not become unduly damaged between trips of the drill string in and out of the well bore, and preferably not during the expected lifetime of a diamond bit, which is presently about 200 hours of drilling.

The seal protecting lubricant may be made from a silicone grease manufactured by the Dow Corning Corporation of Midland, Michigan, and known as "Dow Corning Valve Seal," to which are added particles of a bismuth-lead-tin-cadmium alloy manufactured by the Cerro Sales Corporation, of New York, New York, and known as "Cerrobend." Although the exact chemical composition of this particular grease is not known to me, it is merely one of many suitable greases which may be used, having in mind the objects of the present invention and the well known characteristics of similar grease, which are readily available to persons skilled in the art in publications such as Chemistry and Technology of Silicones, by Walter Noll, published in 1968 (see pages 455–474). Although the exact chemical composition of this particular alloy is also not known to me, other alloys having substantially the same characteristics are known to consist of about 50% bismuth, 26.7% lead, 13.3% tin, and 10.0% cadmium, by weight. Although having a specific gravity of just slightly above 1.0, this grease, when mixed with a sufficient volume of alloy, preferably ground into fine particles, will result in a lubricant having a specific gravity in the order of 4.5.

Although solid at ambient surface level temperatures, an alloy of this type has a low melting point and thus will be liquid when used in the tool in the well bore. Furthermore, this melting point is below the disintegration temperature of the silicone grease.

Obviously, other conventional lubricants may be used as a base in producing the desired seal protecting lubricant. Also, of course, other heavy metals, such as silver, lead or Mercury may be found suitable, although the above-described alloy is preferred due to its mixability at a relatively low temperature. Still further, it may also be desired to mix lubricant additives, such as graphite or molybdenom disulfide, to the mixture.

In the drawings, wherein like reference characters are used throughout to designate like parts:

Figure 1:
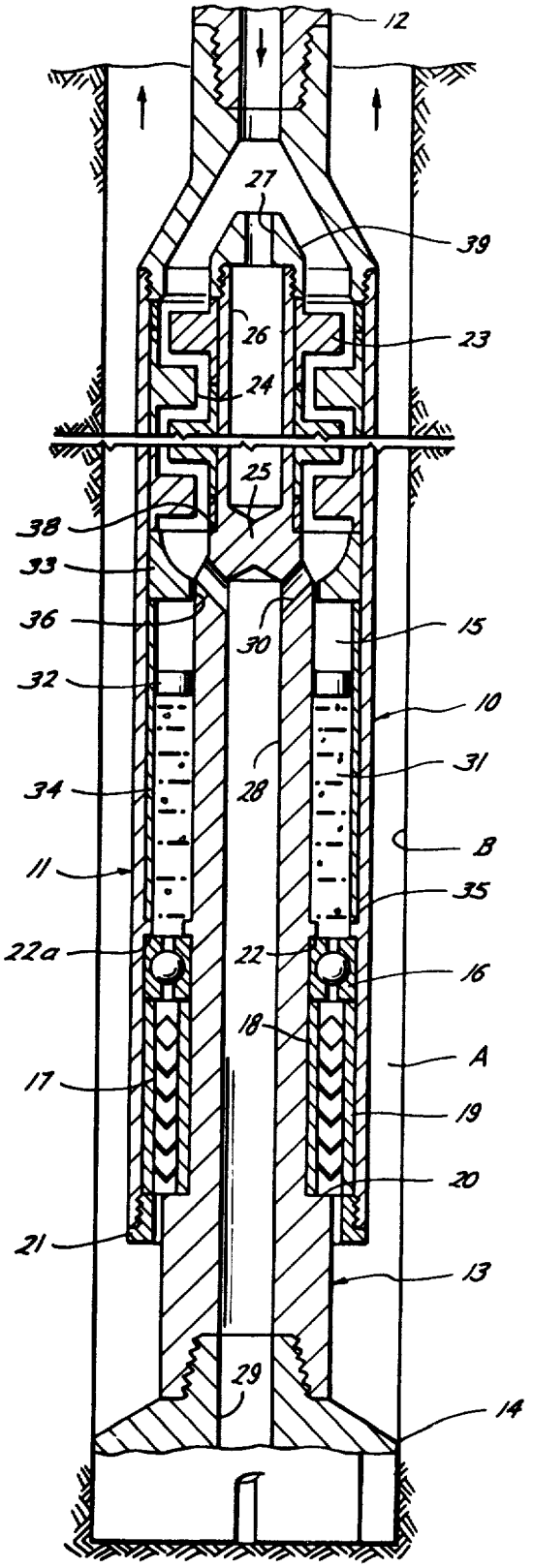
FIG. 1 is a vertical sectional view of the first described type of tool constructed in accordance with the preferred embodiment of the present invention.

With reference now to the details of the above described drawings, tool 10 constructed in accordance with the first embodiment of the invention is shown in FIG. 1 to comprise an outer tubular member 11 suspended from the lower end of a drill string 12 disposed within a well bore B, and an inner shaft member 13 supported for rotation within the outer member and having a bit 14 on its lower end which rests on the bottom of the well bore. More particularly, the tool 10 is a turbodrill having means to be described for causing the shaft member and thus the bit 14 to rotate with respect to the drill string in response to circulation of drilling fluid downwardly through the drill string, out the bit and upwardly within annulus A between the well bore and the tool.

Outer tubular member 11 is mounted concentrically about the inner shaft member 13 to provide an annular space 15 between them which is open at its upper end to the outside of the tool. A turbine section T is disposed within an upper portion of the space, and a bearing 16 is disposed within the space below the turbine section T for rotatably supporting the shaft member from the tubular member. More particularly, a seal means 17 is disposed within the space 15 below the turbine section and bearing 16 for sealing between the members, and thus confining drilling fluid for circulation downwardly through the turbine section T and out the bit 14. Seal means 17 contains the pressure differential between the inside and outside of the tool which results from the pressure drop in drilling fluid as its passes through the bit.

Seal means 17 comprises Chevron type packing disposed between inner and outer sleeves 18 and 19 fitting closely about the outer diameter of shaft member 13 and closely within inner diameter of tubular member 11, respectively. The inner sleeve 18 is supported on an upwardly facing shoulder 20 about shaft member 13, and the outer sleeve 19 is supported on a nut 21 at the lower end of tubular member 11. The inner and outer races bearing means 16 are supported on the upper ends of the inner and outer sleeves and are held down by means of annular shoulders 22 and 22A on the shaft and tubular members, respectively.

The turbine section T of the tool 10 comprises turbine blades 23 on the upper end of the shaft member arranged in alternative relation with respect to turbine blades 24 on upper end of tubular member 11. Shaft member 13 is closed at 25 to divert drilling mud circulating downwardly through the drill string 12 into the upper end of annular space 15 for passage through the turbine section. As shown, the upper end of shaft 13 is open to form a chamber 26 having a port 27 connecting its upper end with the inside of tubular member 11.

Upon passage through the turbine section T, drilling mud passes through ports 30 in the shaft member beneath solid section 25 into a bore 28 through the lower end of the shaft member for circulation downwardly into the aligned bore 29 of the drill bit 14. The drilling mud is diverted into the ports 30 by means of a diverter flange 33 which fits closely within the outer member 11 and has an inner diameter forming a restricted passage about shaft member 13. Although the restricted passage permits mud to pass into space 15 above the bearings, it minimizes turbulence therein and also filters out shale and other large particles in the mud.

The turbine blades 23 and 24 may be constructed with their upper faces angled in opposite directions so that the flow of drilling mud therethrough rotates the shaft member with respect to the tubular member, in a manner well known in the art. Preferably, and as shown, the turbine blades are carried on sleeves which are stacked one above the other about the shaft member and within the tubular member. The turbine section is shown as discontinuous since, as will be appreciated, it will ordinarily be of considerable length.

In accordance with the novel aspects of the present invention, the portion of the annular space 15 above seal means 17 is filled with a heavy lubricant 31 having the previously described characteristics with respect to the drilling mud. More particularly, and as shown in FIG. 1, the lubricant is filled to an upper level well above the bearing 16, but below the ports 30. Although there may be some loss of lubricant past the seal means 17, there is obviously an excess of same within the annular space for protecting the bearings and the seal means from the drilling mud. Also, although the lower end of the seal means 17 is exposed to the drilling mud, such mud is at a lower pressure than that within the tool, so that the abrasive particles in the drilling mud do not get between the sealing surfaces of the seal means and the inner and outer members of the tool.

As previously described, a ring 32 is relatively closely received within the annular space between the outer diameter of shaft member 13 and a sleeve 34 on the inner diameter of outer member 11 for floating on the interface between the drilling mud and lubricant 31. For this purpose, the ring 32 is made of a material which has a higher specific gravity than mud, but a lower specific gravity than the lubricant. As also previously described, the primary function of the ring 32 is to reduce agitation at the interface between the drilling mud and lubricant which might otherwise promote their mixture. Furthermore, of course, since the ring 32 fits relatively closely within the annular space, and since the lubricant is a heavy material, ring 32 further serves to contain the lubricant within the annular space when the tool is laid down on its side.

Sleeve 34 is seated on an upwardly facing shoulder 35 on outer member 11, and supports diverter flange 33, which in turn supports turbine blades 24. The turbine blades 23 are supported on a shoulder 38 about shaft member 13, and are held down by a cap 39 on the upper end of the shaft member through which port 27 is formed.

Annular space 15 above bearings 16 may be filled with liquid lubricant through suitable port (not shown) in tubular member 11 and sleeve 34, below ring 32. During filling, the ring 32 forms a limit stop by engagement with the lower end of diverter ring 33. If a solid (at surface temperature) lubricant is used, it may first be heated to permit it to be poured into the space, and then permitted to solidify in the space as it cools.

Figure 2:
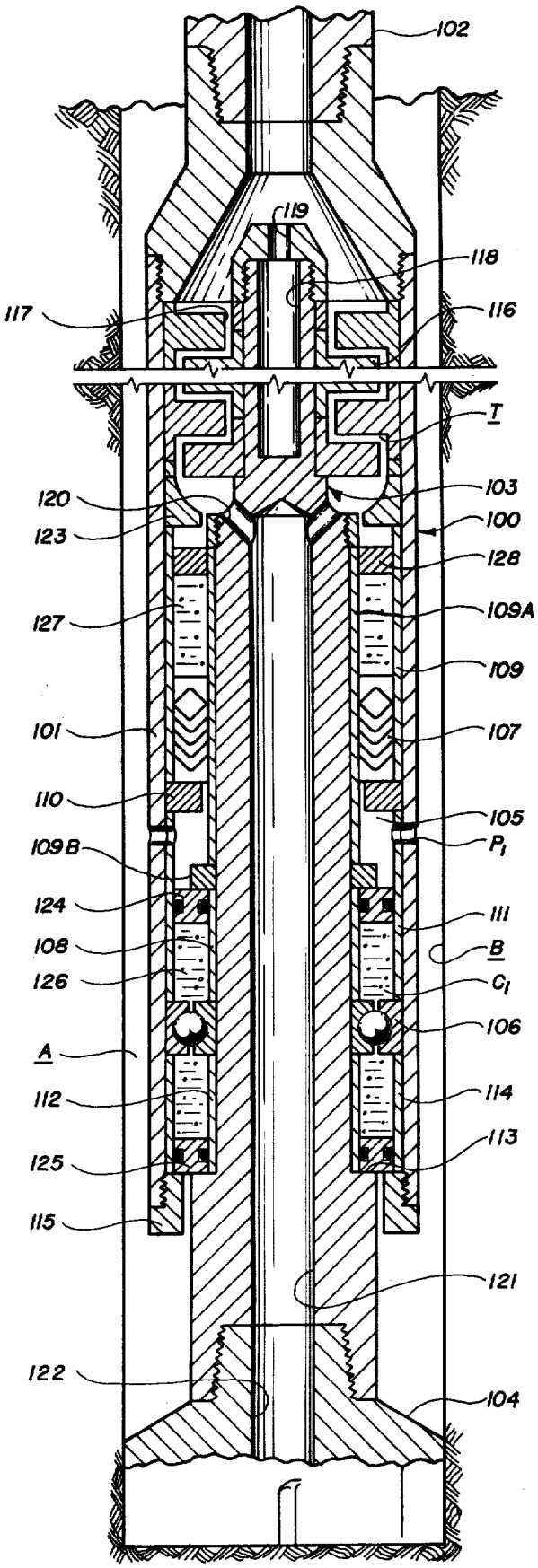
FIG. 2 is a vertical sectional view of such a tool constructed in accordance with a first alternative embodiment of the invention.

Tool 100 constructed in accordance with one form of the second embodiment of the invention is shown in FIG. 2 to be similar in many respects to tool 10 of FIG. 1. Thus, it also comprises an outer tubular member 101 suspended from the lower end of a drill string 102 disposed within a well bore B, and an inner shaft member 103 supported for rotation within the outer member and having a bit 104 at its lower end which rests on the bottom of the well bore. Furthermore, as in the case of the tool 10, tool 100 is a turbodrill having means for causing the shaft member and thus the bit 14 to rotate with respect to the drill string in response to circulation of drilling fluid downwardly through the drill string, out the bit, and upwardly within the annulus A between well bore and the tool.

As was also true of tool 10, outer tubular member 11 is mounted concentrically about the inner shaft member 13 to provide an annular space 105 between them which is open at its upper end to the inside of the tool and at its lower end to the outside of the tool, a turbine section T is disposed within an upper portion of the space, and a bearing 106 is disposed within the space below the turbine section for rotatably supporting the shaft member from the tubular member. Still further, a seal means 107 is disposed within the space 105 below the turbine section T for sealing between the members to confine drilling fluid for circulation downwardly through the turbine section and out the bit. Although, as compared with the tool 10, seal means 107 is mounted within the annular space above bearing 106, a port $P_1$ is formed in outer member 101 to fluidly connect a portion of chamber 105 intermediate the seal means and the bearing with the exterior of the tool, whereby seal means 107 functions similarly to seal means 17 in that it contains the pressure differential between the inside and outside of the tool.

As shown in FIG. 2, seal means 107 comprises Chevron type packing between inner and outer sleeves 109A and 109 fitting closely about the outer diameter of shaft 103 and closely within the inner diameter of tubular member 101, respectively. The inner sleeve 109A is supported on a ring 109B, which in turn is supported on a sleeve 108 above the inner race of bearing 106, and the outer sleeve 109 and lower end of the packing of seal means 107 are supported on a flange 110, which in turn is supported on the upper end of an outer sleeve 111 above the outer race of bearing 106. The inner race of bearing 106 is supported on a sleeve 112 which in turn is supported on an upwardly facing shoulder 113 about a lower portion of shaft member 103, and the outer race of the bearing is supported on an outer sleeve 114, which in turn is supported by means of a nut 115 on the lower end of outer tubular member 101. Sleeve 111 is of course ported in alignment with port $P_1$ through outer tubular member 101.

The turbine section T of tool 100 is shown to be identical to that of tool 10 in that it comprises turbine blades 116 on the upper end of the shaft member arranged in alternative relation with respect to turbine blades 117 on the upper end of tubular member 101. Also, as in the case of shaft member 13 of tool 10, the upper end of shaft member 103 is open to form a chamber 118 connected by means of a port 119 at its upper end with the inside of outer tubular member 101. Shaft member 103 also has ports 120 therein beneath chamber 118 to permit drilling mud to pass from the turbine section into bore 121 through the lower end of the shaft, and thus into the bore 122 of bit 104. Still further, there is a flange 123 on the inner diameter of the tubular member beneath the turbine section for diverting the mud into the ports 120, and thus for passage downwardly to bit 104, the lower end of the flange being supported on the upper end of sleeve 109, and the turbine blades 117 being stacked above the flange.

Bearing 106 is disposed within lubricant 126 contained within a lubricant chamber $C_1$ within a lower portion of annular space 105 which is defined at its upper end by seal means 124 and at its lower end by seal means 125. As shown, each such seal means is vertically slidable within the annular space so as to vary the volume of the chamber $C_1$ in response to changes in fluid pressure above and below the seal means. In this latter respect, because of the port $P_1$ in this outer tubular member above upper seal means 124, both seal means are subject to substantially the same fluid pressure—namely, that of drilling fluid in the annulus A.

Since the seal means 124 and 125 are free to compensate for changes in this pressure, there is substantially no pressure differential across them, and thus little tendency for the lubricant to leak from the chamber. Consequently in this embodiment of the invention, the bearing means may be protected by disposal within a conventional lubricant, even though of substantially less specific gravity than that of the drilling mud.

On the other hand, a portion of the annular space 105 above the pressure dividing seal means 107 is filled with a heavy lubricant 127 having characteristics with respect to the drilling fluid which were previously described in connection with lubricant 31 of tool 10. In this respect then, lubricant 127 protects the seal means 107 in the same sense that lubricant 31 in the tool 10 protects seal means 17. However, since the bearing means 106 is protected within the pressure compensating chamber $C_1$, the level of lubricant 127 need only be sufficiently high to protect seal means 107, having in mind a sufficient reserve to compensate for the small leakage of lubricant which might take place past the seal means 107, as well as the need for maintaining the level of the lubricant 127 below the ports 120. As in the case of tool 10, since the drilling fluid to which the lower end of the seal means 107 is exposed is at a lower pressure than that within the tool, the abrasive particles therein do not get between the sealing surfaces of seal means 107 and the inner and outer members of the tool.

A ring 128 fits relatively closely between the inner and outer sleeves 109A and 109 within the annular space 105 above bearing 106 for floating on the interface between the drilling mud and lubricant 127. Thus, as in the case of ring 32 of tool 10, ring 128 is made of a material which is lighter than the lubricant, but heavier than the drilling mud, so that it will remain at the interface.

Figure 3:
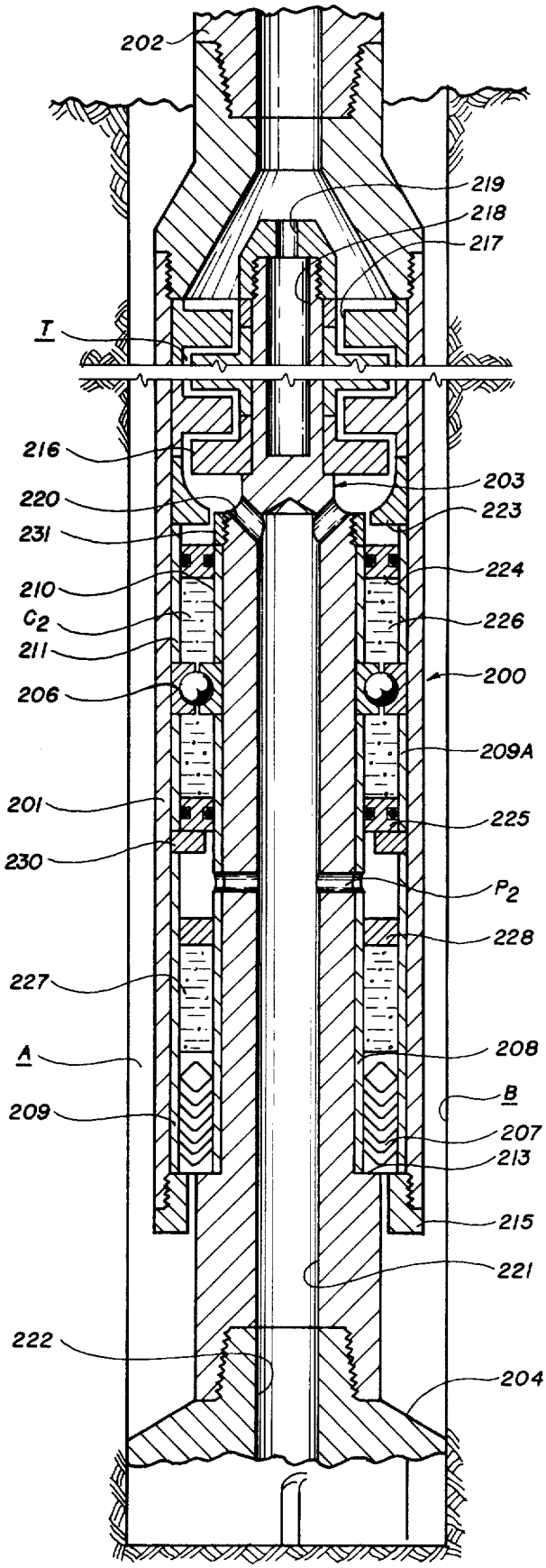
FIG. 3 is a vertical sectional view of such a tool constructed in accordance with a second alternative embodiment of the invention.

Tool 200 constructed in accordance with another form of the second embodiment of the invention is shown in FIG. 3 to be identical, in many respects, to tool 100 of FIG. 1. Thus, many parts of the tool 200 bear the same reference characters as corresponding parts of tool 100, except for the prefix "2" instead of "1," and where the functions of these parts are the same as those of corresponding parts of tool 100, their description will not be repeated.

The primary differences between the tools 100 and 200 are that, in the latter, bearing 206 which rotatably supports shaft member 203 connected to bit 204 from tubular member 201 connected to drill string 202 is disposed above, rather than below, a pressure dividing seal means 207, and the portion of an annular space 205 between the members which is intermediate the bearing and a variable volume pressure chamber $C_2$ within which the bearing and seal means are disposed is fluidly connected by means of a port $P_2$ in a shaft member 203 to the inside, rather than to the outside, of the tool. As a consequence, although the pressure differential between the inside and outside of the tool is contained by seal means 207, as in the case of the tool 100, the fluid pressure above and below seal means 224 and 225 defining the upper and lower ends of lubricant chamber $C_2$ are subject to the fluid pressure on the inside, rather than on the outside, of the tool. In any event, however, since seal means are subjected to substantially the same pressure, and further since the seal rings 224 and 225 are vertically slidable within the annular space 205, there is essentially no pressure differential across them. Thus, similarly to the chamber $C_1$ of tool 100, bearing chamber $C_2$ may be filled with a conventional lubricant 226 having a specific gravity substantially lower than that of the drilling mud.

On the other hand, although disposed beneath bearing 206, seal means 207 nevertheless contains the pressure differential between drilling fluid within the tool (which has access to the annular space above seal means 207 through ports $P_2$) and that on the exterior of the tool. Similarly to tool 100, lubricant 227 in a portion of the annular space above seal means 207 is of the heavier variety having the characteristics with respect to the drilling fluid identical to those previously described in connection with lubricant of tool 100. Thus, as in the case of tool 100, lubricant 227 protects seal means 207 by being maintained at a level thereabove sufficient to compensate for any small leakage past the seal means 207, and bearing 206 is otherwise protected from the drilling fluid inasmuch as it is disposed within the pressure compensating chamber $C_2$.Still further, and again as in the case of the tool 100, abrasive particles in the drilling fluid do not get between the sealing surface of seal means 207 and the inner and outer members of the tool inasmuch as such fluid beneath the seal means is at a lower pressure than that within the tool.

As in tool 100, turbine blades 216 and 217 are mounted on the shaft member and tubular member, respectively, within the upper end of space 205. Also, drilling fluid passing through the turbine section is diverted into ports 220 by means of flange 223, and thus into bore 221 in the shaft member leading to bore 222 in the bit.

The Chevron type packing making up seal means 207 is disposed between an outer sleeve 209 fitting closely within the inner diameter of the outer tubular member 201, and an inner sleeve 208 which fits closely about the outer diameter of shaft member 203. The lower end of the inner sleeve 208 is supported on a shoulder 213 about the shaft member, and the lower end of outer sleeve 209 is supported by a nut 215 threaded to the lower end of outer member 201. Outer sleeve 209 extends upwardly to support a ring 230, which in turn supports an outer sleeve 209A extending upwardly to support outer race of bearing 206. Inner sleeve 208 extends upwardly to support the inner bearing race, and is ported intermediate its length in alignment with port $P_2$ in the shaft member.

The lower seal means 225 defining the lower end of chamber $C_2$ is sealably slidable within outer sleeve 209A and the upper end of inner sleeve 208. The upper seal means 224 defining the upper end of chamber $C_2$ is sealably slidable within an inner sleeve 210 which is supported above the inner bearing race and fits closely about the outer diameter of the shaft member, and outer sleeve 211 which is supported above the outer bearing race and fits closely within the inner diameter of the tubular member. The outer sleeve 211 supports a flange 223 which diverts the flow of drilling fluid into ports 220, and the turbine blades 217 mounted on the outer member are stacked above the flange 223 in alternating relation with turbine blades 216. The upper end of inner sleeve 210 is held down by a nut 231 threaded about shaft 203 beneath ports 220.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A well tool adapted to be connected as part of a pipe string through which drilling fluid is circulated, comprising inner and outer members defining an annular space therebetween having one end opening to the inside of the tool and another end opening to the outside of the tool, bearing means on the members within said space supporting them for rotation with respect to one another, motor means within said space for so rotating the members, means sealing between said members [for separating the fluid on the other side of said tool from that] within the said space [above the seal means], and a body of material within the space above the sealing means which [includes a metallic weighting substance which is liquid during drilling operations, said material having] *(a) comprises a liquid whose specific gravity is not substantially greater than that of the drilling fluid, but which is impregnated with metal particles whose specific gravity is substantially greater than that of the drilling fluid so that said material has* a specific gravity which is sufficiently greater than that of the drilling fluid and [being] *(b) which is* sufficiently insoluble with the drilling fluid, during drilling operations, that it substantially excludes drilling fluid [therefrom] *from the sealing means.*

2. A tool of the character defined in claim 1, wherein the material has a specific gravity of not substantially less than 2.5.

3. A tool of the character defined in claim 2, wherein the [material] *liquid* is a lubricant.

4. A tool of the character defined in claim 2, wherein the material has a specific gravity of not less than 4.5.

5. A tool of the character defined in claim 4, wherein the [material] *liquid* is a lubricant.

[6. A tool of the character defined in claim 1, wherein the metallic weighting substance comprises metal particles of high density material.]

7. A tool of the character defined in claim [6] *1*, wherein the [material also includes] *liquid is* a grease type lubricant.

8. A tool of the character defined in claim [6] *1*, wherein said [material also includes] *liquid is* a silicone type lubricant.

9. A tool of the character defined in claim 1, wherein the [material is] metal [which is] *particles are* solid at ambient surface level temperatures *and liquid during drilling operations.*

10. A tool of the character defined in claim 9, wherein the [material] *liquid* is a lubricant.

11. A tool of the character defined in claim 1, including a ring which fits relatively closely in said annular space and floats on the interface between said drilling fluid and material.

12. A tool of the character defined in claim 1, wherein the motor means comprises turbine blades on the inner and outer members above the level of the material.

13. A tool of the character defined in claim 1, wherein the upper end of the outer member has means thereon for connection to the lower end of the drill string, and the lower end of the inner member has means thereon for connection to the bit.

14. A tool of the character defined in claim 1, wherein the bearing means is above the sealing means.

15. A tool of the character defined in claim 1, wherein the bearing means is below the sealing means.

16. A well drilling tool adapted to be connected to the lower end of a drill string above the drill bit, whereby drilling fluid may be circulated downwardly through the inside of the tool and upwardly within the annulus between the outside of the tool and the bore of the well being drilled, comprising inner and outer members defining an annular space therebetween having one end opening to the inside of the tool and another end opening to the outside of the tool, bearing means on the members within said space supporting them for rotation with respect to one another, motor means within said space for so rotating the members, means sealing between said members beneath the bearing means [for separating the fluid on the outer side of said tool from that] within the said space [above the seal means], and a body of material within the space above the sealing means which [includes a metallic weighting substance which is liquid during drilling operations and which] has an upper level above the bearing means so that the bearing means is contained therein, [said material having] *and (a) comprises a liquid whose specific gravity is not substantially greater than that of the drilling fluid, but which is impregnated with metal particles whose specific gravity is substantially greater than that of the drilling fluid so that said material has* a specific gravity which is sufficiently greater than that of the drilling fluid and [being] *(b) which is* sufficiently insoluble with the drilling fluid, during drilling operations, that it substantially excludes drilling fluid [therefrom] *from the sealing and bearing means.*

17. A tool of the character defined in claim 16, wherein the material has a specific gravity of not substantially less than 2.5.

18. A tool of the character defined in claim 17, wherein the [material] *liquid* is a lubricant.

19. A tool of the character defined in claim 17, wherein the material has a specific gravity of not substantially less than 4.5.

20. A tool of the character defined in claim 19, wherein the [material] *liquid* is a lubricant.

[21. A tool of the character defined in claim 16, wherein the metallic weighting substance comprises metal particles of high density material.]

22. A tool of the character defined in claim [21] *16*, wherein the [material also includes] *liquid is* a grease type lubricant.

23. A tool of the character defined in claim [21] *16*, wherein said [material also includes] *liquid is* a silicone type lubricant.

24. A tool of the character defined in claim 16, wherein the [material is] metal [which is] *particles are* solid at ambient surface level temperatures *and liquid during drilling operations.*

25. A tool of the character defined in claim 24, wherein the [material] *liquid* is a lubricant.

26. A tool of the character defined in claim 16, including a ring which fits relatively closely in said annular space and floats on the interface between said drilling fluid and material.

27. A tool of the character defined in claim 16, wherein the motor means comprises turbine blades on the inner and outer members above the upper level of said material.

28. A tool of the character defined in claim 27, wherein the turbine blades are above the bearing means, and there is at least one port in the inner member connecting the annular space with the interior of the inner member intermediate the lowermost turbine blades and the upper level of said material.

29. A tool of the character defined in claim 16, wherein the upper end of the outer member has means thereon for connection to the lower end of the drill string, and the lower end of the inner member has means thereon for connection to the bit.

30. A well drilling tool adapted to be connected to the lower end of a drill string above the drill bit, whereby drilling fluid may be circulated downwardly through the inside of the tool and upwardly within the annulus between the outside of the tool and the bore of the well being drilled, comprising inner and outer members defining an annular space therebetween, bearing means on the members within said space supporting them for rotation with respect to one another, motor means within said space for so rotating the members, first means sealing between said members for separating the fluid on one side of said tool from that within a portion of said space, means providing a variable volume lubricant chamber including second and third sealing means between said members above and below said bearing means within the space portion and means fluidly connecting the other side of the tool with said space portion above and below said second and third sealing means, respectively, whereby said first seal means is adapted to contain the pressure differential between the inner and outer sides of the tool, and said second and third sealing means separate the chamber between them from the fluid on said other side of the tool, a body of material within the space above the first sealing means which includes a metallic weighting substance [which is liquid during drilling operations and which has an upper level above the bearing means so that the bearing means is contained therein], said material having a specific gravity which is sufficiently greater than that of the drilling fluid and being sufficiently insoluble with the drilling fluid, during drilling operations, that it substantially excludes drilling fluid [therefrom] *from the sealing means.*

31. A well drilling tool of the character defined in claim 30, wherein said first sealing means is below the second and third sealing means to separate the fluid on the outer side of the tool from said space portion, and the fluidly connecting means connects the space portion above and below the second and third sealing means with the inner side of the tool.

32. A well drilling tool of the character defined in claim 30, wherein said first sealing means is above the second and third sealing means to separate the fluid on the inner side of the tool from said space portion, and the fluidly connecting means connects the space portion above and below the second and third sealing means with the outer side of the tool.

33. A well drilling tool of the character defined in claim 30, wherein one member comprises a shaft member having means for connection to the bit, and the other member has means for connecting it to the lower end of the drill string.

34. A well drilling tool of the character defined in claim 33, wherein said one member is the inner member, and said other member is the outer member.

35. A well drilling tool of the character defined in claim 30, wherein at least one of said second and third sealing means comprises a seal ring which is vertically slidable within said space portion to permit the volume of said chamber to vary.

36. A tool of the character defined in claim 30, wherein the material has a specific gravity of not substantially less than 2.5.

37. A tool of the character defined in claim 36, wherein the material is a lubricant *impregnated with metal particles.*

38. A tool of the character defined in claim 36, wherein the material has a specific gravity of not substantially less than 4.5.

39. A tool of the character defined in claim 38, wherein the material is a lubricant *impregnated with metal particles.*

[40. A tool of the character defined in claim 30, wherein the metallic weighting substance comprises metal particles of high density material.]

41. A tool of the character defined in claim [40] *30,* wherein said material [also contains] *is* a silicone lubricant *impregnated with metal particles.*

42. A tool of the character defined in claim 30, including a ring which fits relatively closely in said annular space and floats on the interface between said drilling fluid and material.

43. A tool of the character defined in claim 30, wherein the motor means comprises turbine blades on the inner and outer members above the upper level of said lubricant.

44. A well tool adapted to be connected as part of a pipe string through which drilling fluid is circulated, comprising inner and outer members defining an annular space therebetween having one end opening to the inside of the tool and another end opening to the outside of the tool, means on the members supporting them for relative movement with respect to one another, means within said space for so moving the members, means sealing between said members [for separating the fluid on the outer side of said tool from that] within the said space [above the seal means], and a body of material within the space above the sealing means which [includes a metallic weighting substance which is liquid during drilling operations said material having] *(a) comprises a liquid whose specific gravity is not substantially greater than that of the drilling fluid, but which is impregnated with metal particles whose specific gravity is substantially greater than that of the drilling fluid so that said material has* a specific gravity which is sufficiently insoluble with the drilling fluid and [being] *(b) which is* sufficiently insoluble with the drilling fluid, during drilling operations, that [is] *it* substantially excludes drilling fluid [therefrom] *from the sealing means.*

45. A tool of the character defined in claim 44, wherein the material has a specific gravity of not substantially less than 2.5.

46. A tool of the character defined in claim 45, wherein the [material] *liquid* is a lubricant.

47. A tool of the character defined in claim 45, wherein the material has a specific gravity of not substantially less than 4.5.

48. A tool of the character defined in claim 47, wherein the [material] *liquid* is a lubricant.

[49. A tool of the character defined in claim 44, wherein the metallic weighting substance comprises metal particles of high density material.]

50. A tool of the character defined in claim [49] *44,* wherein the [material also includes] *liquid is* a grease type lubricant.

51. A tool of the character defined in claim [49] *44,* wherein said [material also includes] *liquid is* a silicone type lubricant.

52. A tool of the character defined in claim 44, wherein the [material is] metal [which is] *particles are* solid at ambient surface level temperatures *and liquid* during drilling operations.

53. A tool of the character defined in claim 52, wherein the [material] *liquid* is a lubricant.

54. A tool of the character defined in claim 44, including a ring which fits relatively closely in said annular space and floats on the interface between said drilling fluid and material.

* * * * *